United States Patent [19]

English et al.

[11] Patent Number: 4,682,065
[45] Date of Patent: Jul. 21, 1987

[54] MOLDED PLASTIC MOTOR HOUSING WITH INTEGRAL STATOR MOUNTING AND SHAFT JOURNALLING PROJECTION

[75] Inventors: George A. English; Charles R. Marracino, both of Torrington, Conn.

[73] Assignee: Nidec-Torin Corporation, Torrington, Conn.

[21] Appl. No.: 797,638

[22] Filed: Nov. 13, 1985

[51] Int. Cl.⁴ ............................................. H02K 5/16
[52] U.S. Cl. ............................. 310/90; 310/40 MM; 310/43; 310/62; 310/67 R; 310/89; 310/156; 384/536; 384/539; 384/582
[58] Field of Search ............... 310/40 MM, 67 R, 90, 310/89, 43, 62, 63, 156.42, 91; 384/535, 536, 581, 582, 585, 539

[56] References Cited

U.S. PATENT DOCUMENTS

| | | | |
|---|---|---|---|
| 3,976,340 | 8/1976 | Pitner | 384/581 |
| 4,130,770 | 12/1978 | Wrobel | 310/62 |
| 4,141,605 | 2/1979 | Riordan | 384/536 |
| 4,142,618 | 3/1979 | Fontaine | 384/535 |
| 4,229,055 | 10/1980 | Olschewski | 384/536 |
| 4,337,405 | 6/1982 | Hishida | 310/43 |

FOREIGN PATENT DOCUMENTS

| | | | |
|---|---|---|---|
| 2555671 | 6/1976 | Fed. Rep. of Germany | 310/67 R |
| 2712824 | 9/1978 | Fed. Rep. of Germany | 310/67 R |
| 2415899 | 9/1979 | France | 310/67 R |
| 0071148 | 5/1980 | Japan | 310/67 R |
| 2027285 | 2/1980 | United Kingdom | 310/67 R |

Primary Examiner—R. Skudy
Attorney, Agent, or Firm—McCormick, Paulding & Huber

[57] ABSTRACT

A molded plastic housing for a small electric motor having a radial end wall and an axially projecting portion for mounting the stator and journalling the motor shaft. An annular stator is mounted on and about the projecting portion and shaft bearings are mounted in axially spaced relationship in interference fit respectively at end sections of the housing portion and in direct engagement with the molded plastic. Reduced diameter and reduced thickness zones at the end sections provide for resilient and firm bearing retention and alignment. Four (4) circumaxially spaced slots at each end section with flats radially inwardly thereof provide for the reduced thickness and reduced diameter. The bearings engage the flats in an interference fit.

14 Claims, 8 Drawing Figures

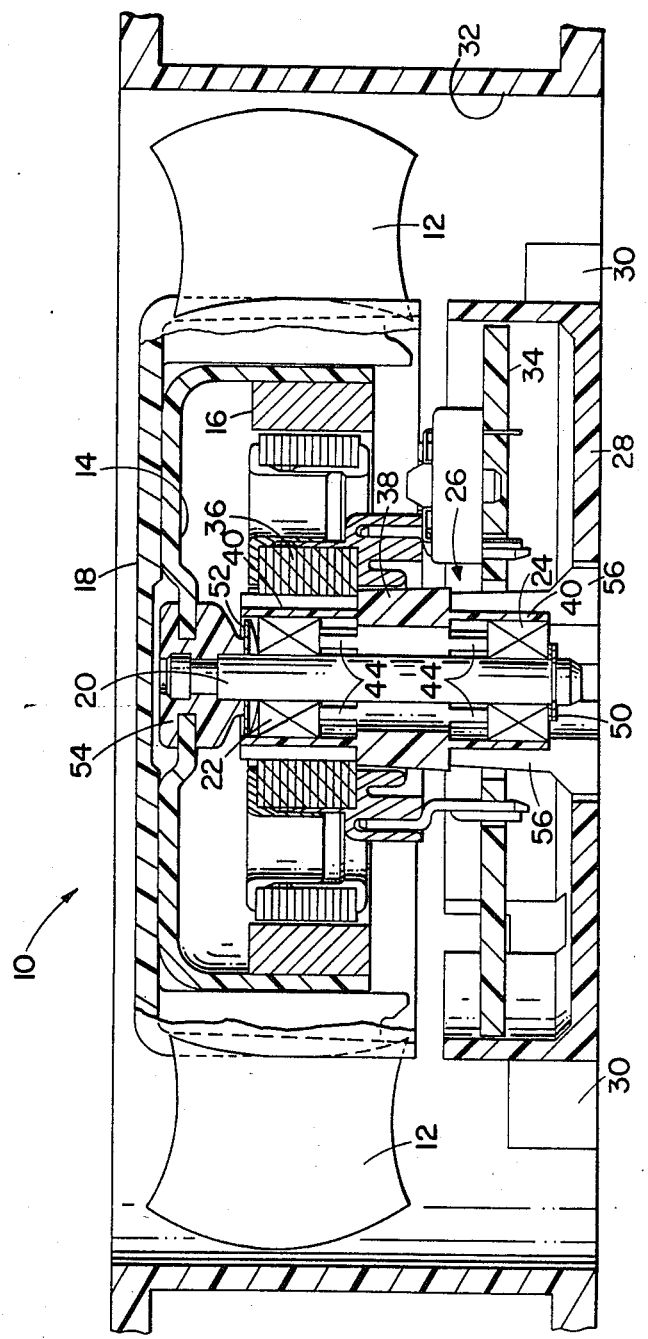

MOLDED PLASTIC MOTOR HOUSING WITH INTEGRAL STATOR MOUNTING AND SHAFT JOURNALLING PROJECTION

BACKGROUND OF THE INVENTION

This invention relates to small electric motors of the type used in axial flow air impeller units commonly found in computers, copy machines, etc. More particularly, the invention relates to an improved molded plastic housing having at least one radial end wall and an axially projecting portion which serves as a mount for an annular stator and a housing for a central shaft and its bearings, the shaft being operatively associated with the annular rotor of the motor which is disposed diametrically outwardly and about the stator and which may comprise a rotor of the permanent magnet type. In constructions wherein the small electric motors have associated air impellers, the rotor comprising the permanent magnet element may have a molded plastic air impeller diametrically outwardly thereof and rotatably driven thereby for the axial flow of air through the unit.

In motor and housing constructions of the type under consideration, it is a conventional practice to provide a metal insert within an axial plastic housing projection to receive and hold the bearings which journal the central motor shaft. Such constructions are generally satisfactory but may be lacking in economic advantage and in ease and convenience of assembly particularly in the case of small high volume motor and air impeller units where savings on the order of a fraction of a cent are highly desirable.

It is the general object of the present invention to provide an improved molded plastic housing wherein an integral axial projection from a radial end wall of the housing serves as a stator mount and a shaft journalling element, the bearings for the shaft being received and held directly within the housing projection and a firm and yet resilient bearing seat thus being provided at substantial economic advantage.

A further object of the present invention resides in the provision of an improved housing of the type mentioned wherein bearing alignment is effectively achieved and maintained, assembly is significantly facilitated, and improved attenuation of vibration and noise transmission is realized.

SUMMARY OF THE INVENTION

In fulfillment of the foregoing objects and in accordance with the present invention, a molded plastic housing is provided for a small electric motor having an annular stator and rotor arranged diametrically in inner-outer relationship and a central shaft operatively associated with and rotatable with the rotor, the shaft being disposed diametrically within the stator. The housing has at least one radially extending end wall and a centrally located and integrally molded stator mounting and shaft journalling tubular housing portion which projects axially from the end wall. The projecting housing portion has intermediate and axially spaced opposite end sections. First and second bearings are disposed respectively in the opposite end sections for rotatably receiving and holding the shaft. Each of the said opposite end sections has its flexibility enhanced by at least three axially extending and circumaxially spaced reduced thickness zones which at least approximate the length of the associated bearing within the end section. The bearings are entered in the end sections of the projecting tubular portion in an interference fit at least at the reduced thickness zone and a slight reduction in the internal diameter of the tubular projection is provided for at least at the reduced thickness zone so that the interference fit between the bearings and the housing portion occurs at said zones. The bearings are thus held efficiently in axial alignment irrespective of slight differences within tolerance of the external diameter of the bearings and the internal diameter of the end sections.

By reason of the reduced thickness and reduced diameter characteristics of the end sections of the projecting housing portion, the necessary flexibility for reception of the bearings in an interference fit is provided and yet the structural integrity of the projecting housing portion is retained so as to provide an effective mount for the annular stator. That is, the stator is mounted on and about the projecting tubular portion and is securely held in position with circumaxial location of the stator being facilitated if desired by means of a small axial rib extending externally of the projecting housing portion.

Preferably, the reduced diameter characteristic of the projecting housing portion at the end sections is provided for by means of small flats at the reduced thickness zones and extending along the internal diametrical surface of the tubular portion. The external diametrical surface of the bearings engages the flats and the bearings are thus held in a resilient and yet firm manner with axial alignment of the bearings readily achieved. Small shoulders may also be molded within the projecting housing portion to locate the bearings axially relative to each other and relative to the shaft receivable therewithin.

BRIEF DESCRIPTION OF THE DRAWINGS

FIG. 2 is an englarged fragmentary vertical section through the motor, impeller, and housing taken generally as indicated at 2, 2 in FIG. 1 illustrating the improved housing of the present invention.

DESCRIPTION OF PREFERRED EMBODIMENTS

Figure 1:
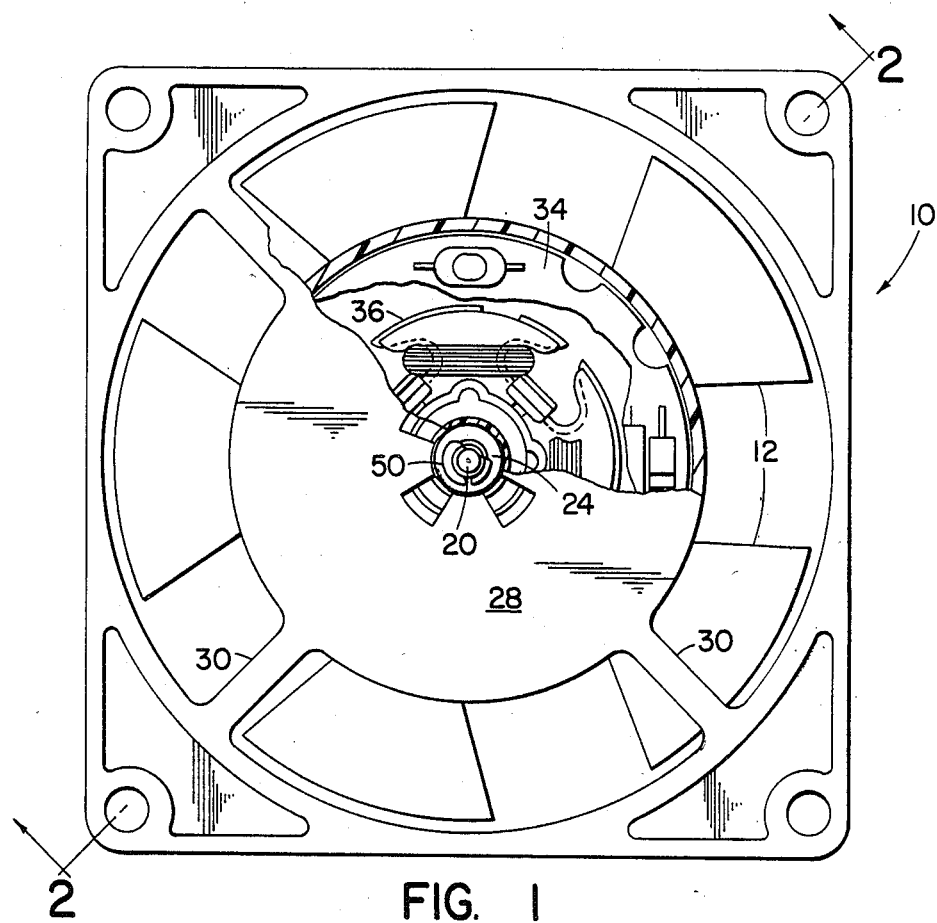
FIG. 1 is an elevational view of an electric motor driven axial flow air impeller which embodies the improved motor housing of the present invention.
Figure 3:
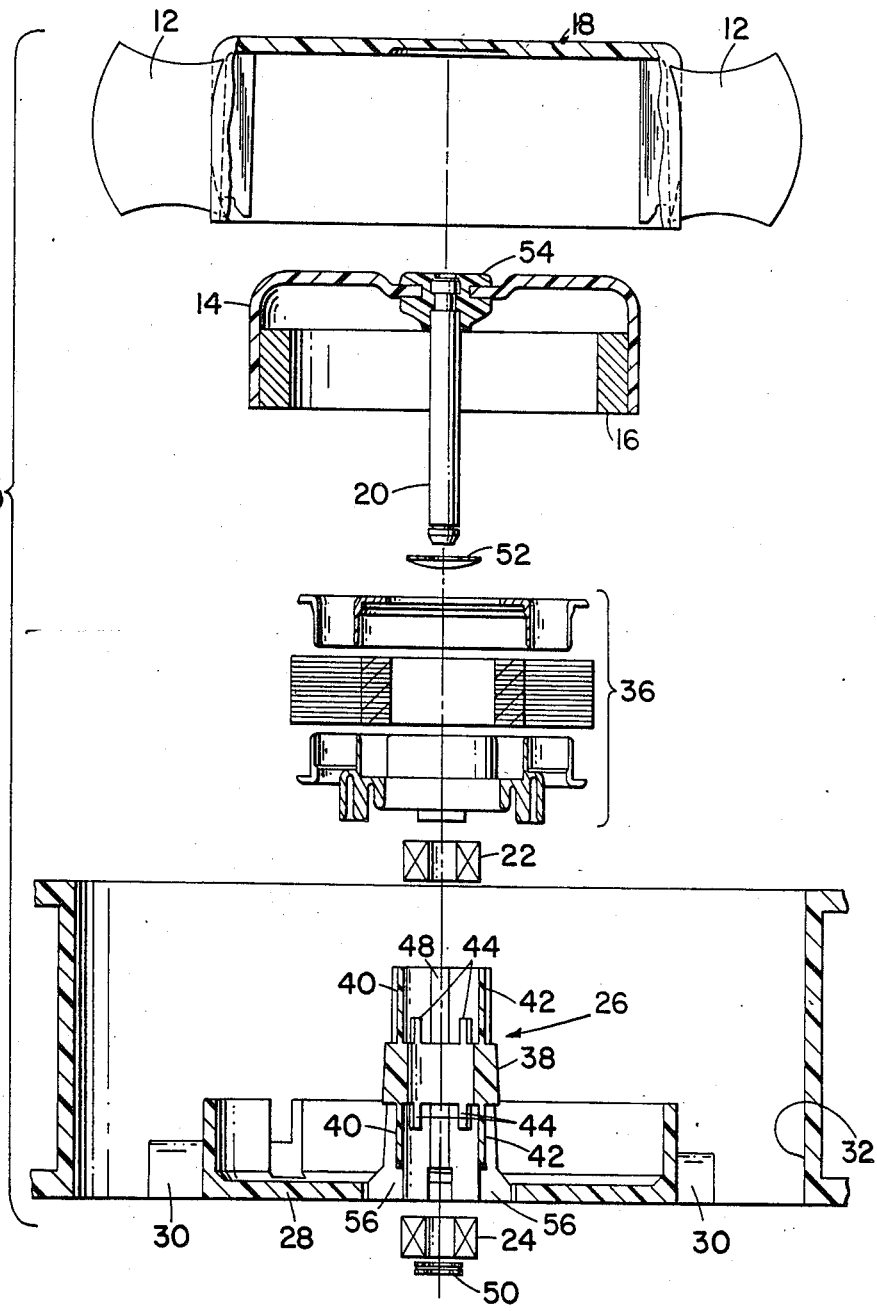
FIG. 3 is an exploded view of the motor, impeller and housing of FIGS. 1 and 2, certain parts being omitted for clarity of illustration.

Referring particularly to FIGS. 1 through 3 it will be observed that a motor and air impeller unit shown therein includes a substantially rectangular housing indicated generally at 10, an air impeller having a plurality of air moving blades 12, 12, five shown, and a rotor 14. The rotor 14 includes a cup-shaped member which mounts an annular permanent magnet rotor 16 and which in turn is secured in driving relationship with a second cup-shaped member 18 which mounts the axial flow air moving blades 12, 12. At an inner or central portion of the cup 14, a shaft 20 is mounted and extends downwardly in cantilever fashion in FIG. 2. The shaft 20 is journalled in first and second or front and rear bearings 22, 24 which are spaced axially within a housing portion indicated generally at 26 and which projects axially upwardly in FIG. 2 from a radial housing portion 28. The radial housing portion or wall 28 is secured by spoke-like elements 30, 30 to the aforementioned outer rectangular housing portion and the motor and fan are thus held in position within a shroud, the latter taking a cylindrical shape as best illustrated in FIGS. 1 and 4.

The radial housing portion 28 takes a generally cup-shaped form as illustrated with a printed circuit board 34 disposed therewithin and with the motor stator 36 mounted on and about the tubular axial housing portion 26. Thus, the projecting axial portion 26 must have the necessary structural rigidity to support the stator 36 and it must also provide a resilient and yet firm housing for the bearings 22, 24 received therewithin and directly held thereby.

Figure 4:
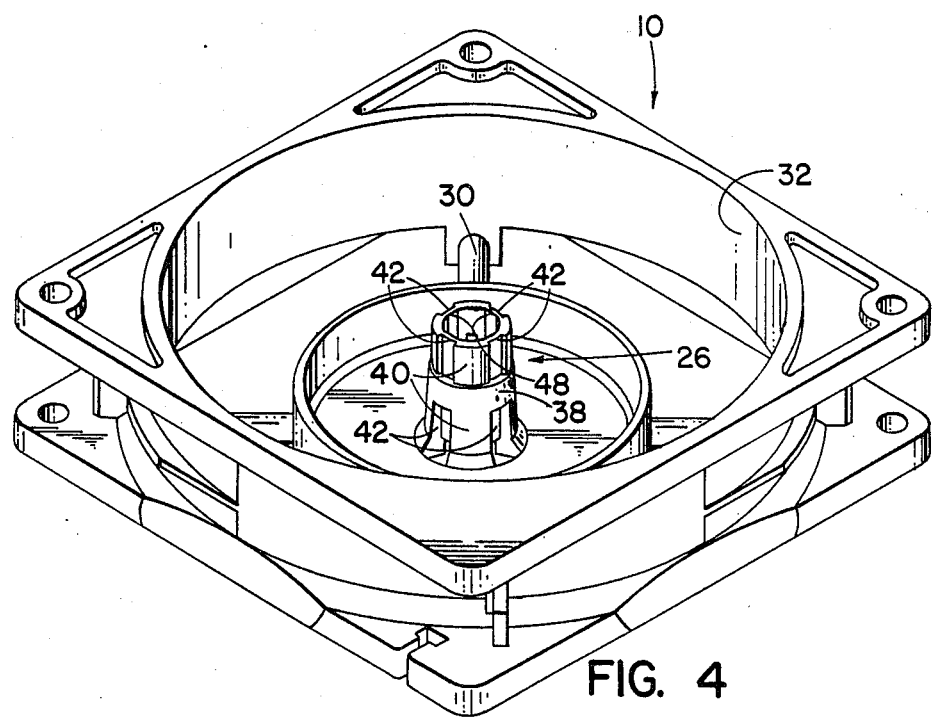
FIG. 4 is a perspective view of the improved housing of the present invention and clearly illustrating the axially projecting housing portion which mounts the stator and journals the shaft.

As best illustrated in FIGS. 3 and 4 projecting the housing portion 26 is formed integrally with radial housing portion or wall 28 and is located centrally thereof and projects axially therefrom. The housing portion 26 includes an intermediate section 38, and opposite end sections, 40, 40, the latter serving to receive and hold the bearings 22, 24.

In accordance with the present invention each of the opposite end sections 40, 40 has its flexibility enhanced by at least three (3) axially extending and circumaxially spaced, reduced diameter and reduced thickness zones. Preferably and as shown, there are four (4) such zones and they include slots 42, 42 best illustrated in FIGS. 4 and 5. The slots 42, 42 open radially outwardly as illustrated and they also open axially at their ends as illustrated in FIGS. 3 and 4. As shown, the reduction in thickness of the tubular housing portion 26 is substantially in excess of one-half at the slots 42, 42. In accordance with the invention such reduction in thickness is at least one-half the thickness of the tubular axial projecting housing portion 26.

The circumaxial dimensions of the slots may vary but is preferably one-third or less the circumference of the projecting tubular housing portion 26 and, as shown, with the four slots 42, 42, each slot extends approximately through one-fourth the circumference of the projecting tubular housing portion 26. With the dimensional relationships discussed and illustrated and with the molded plastic housing constructed of polybutylene terephthalate, a desired degree of resilient and yet firm retention of the bearings 22, 24 is achieved. The bearings 22, 24 may comprise conventional rolling bearings, sleeve bearings, etc.

Figure 5:
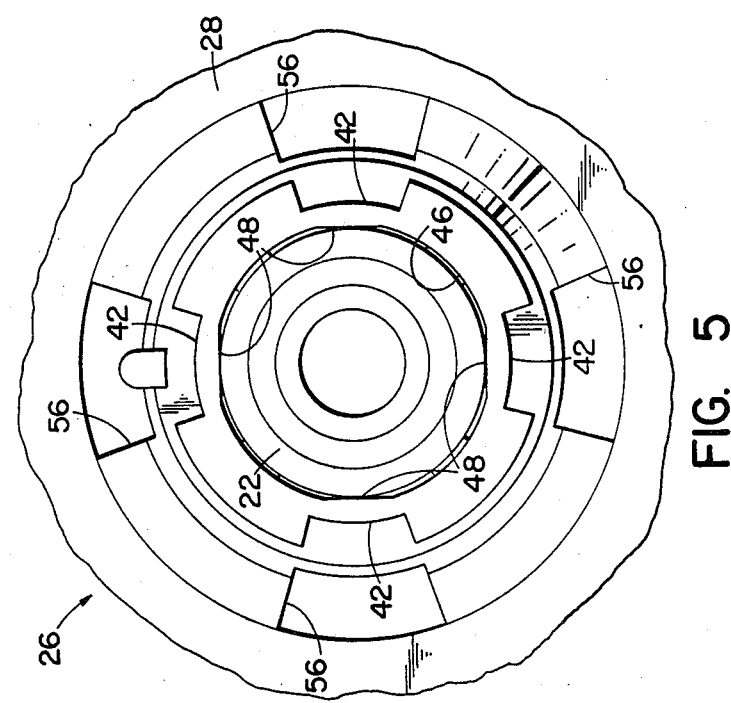
FIG. 5 is an enlarged fragmentary end view of the axial projecting portion of the housing with a bearing mounted therein.

Precise axial positioning of the bearings 22, 24 may be readily provided for with the molded shoulders 44, 44 internally in the housing portion 26. As is well known, the precision attainable in a molding process provides for accurate and square shoulders enhancing bearing alignment. The retention and alignment of the bearings is achieved with an interference fit of the bearings with slightly reduced diameter portions of the housing portion 26 as best illustrated in FIG. 5. More particularly, the internal diametrical surface 46 of the housing portion 26 is slightly reduced diametrically at the zones or slots 42, 42. As best illustrated in FIG. 5, flats 48, 48 are provided for this purpose. Alternatively, the reduction in diameter may of course be achieved by providing small areas or zones of a somewhat larger radius inwardly of the slots 42, 42. In any event, the bearing 22 illustrated in FIG. 5 is mounted in an interference fit and in engagement with at least the four (4) flats 48, 48, in FIG. 5 with the opposite or rear bearing 24 being similarly mounted in axial alignment therewith. At a rear portion of the shaft 20, a snap ring 50 engages the rear bearing 24 and secures the same in position, and a disc spring 52 at a front portion of the shaft is in engagement with the bearing 22 and a central hub portion 54 of the cup 14 whereby to secure the bearing 22 in position against its seat 44, 44.

The stator 36 is mounted on and about the axially projecting housing portion 26 and the necessary strength and rigidity of the housing portion is provided for by the substantial thickness of the walls thereof at the intermediate portion 38 and between the slots 42, 42. Further, the structural integrity of the housing portion 26 relative to the radial wall 28 is insured by fin-like elements 56, 56 of substantial thickness and which connect the housing portion 26 to the radial wall 28 between the slots 42, 42.

Figure 6:
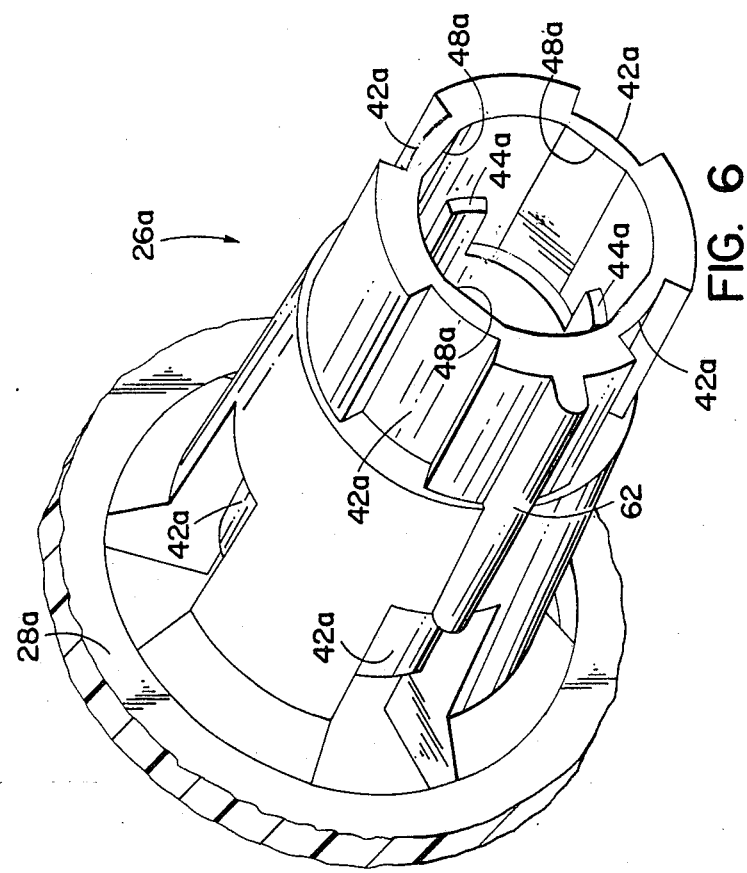
FIG. 6 is a fragmentary enlarged perspective view of a further embodiment of the improved housing of the present invention.
Figure 8:
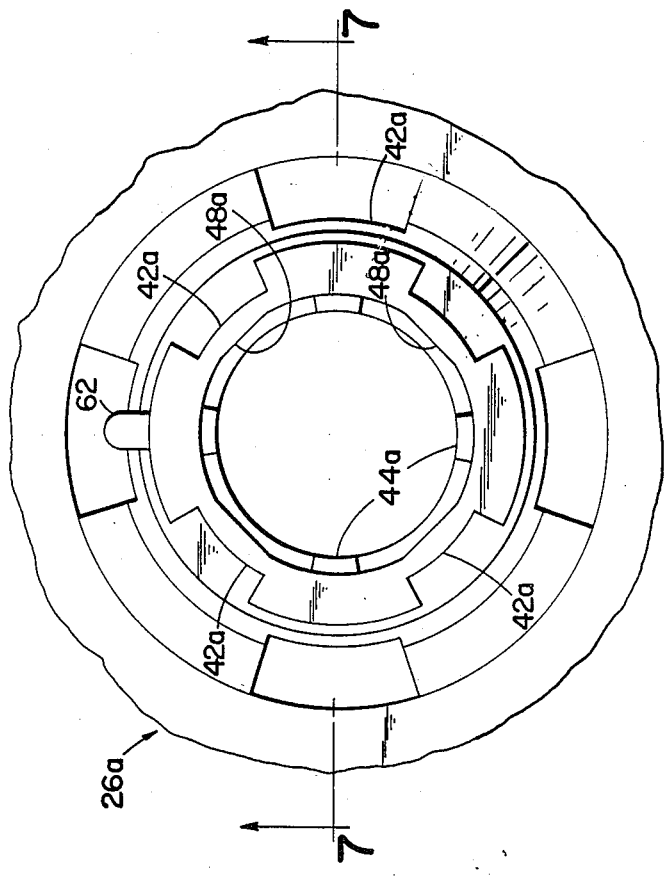
FIG. 8 is an end view of the housing portion of FIG. 6 and FIG. 7.
Figure 7:
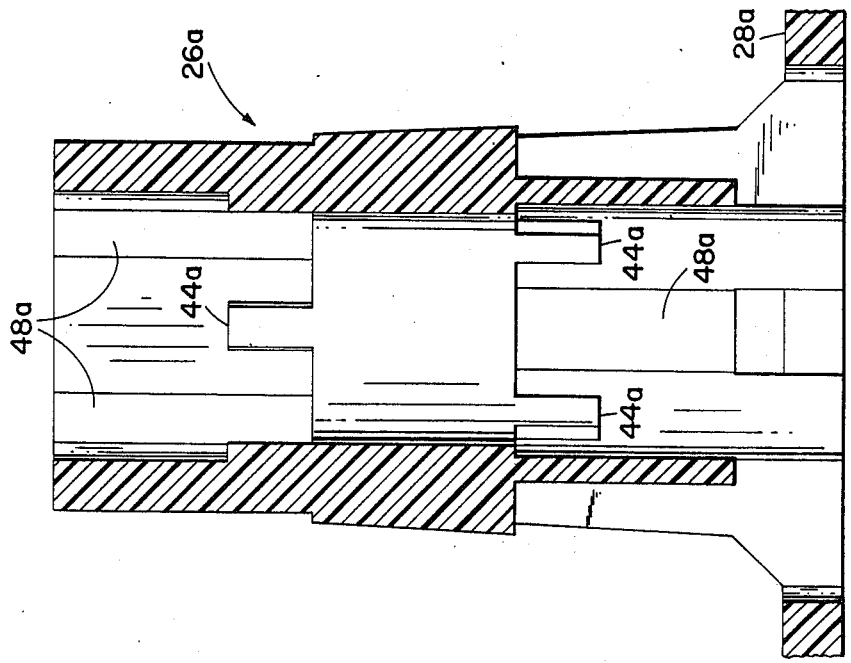
FIG. 7 is an axial section through the housing portion of FIG. 6.

As will be observed in the drawings, the slots 42, 42 reside in axial alignment in the embodiment disclosed in FIGS. 1 through 5. In the optional embodiment of FIGS. 6 through 8, slots 42a, 42a are substantially identical with slots 42, 42 above but it will be observed that the slots 42a, 42a at a front portion of a housing portion 26a are displaced circumaxially relative to slots 42a, 42a at a rear portion thereof. The housing portion 26a is also provided with a radially outwardly projecting rib which extends axially at 62 and which may be employed in locating a stator circumaxially thereabout during an assembly procedure. In FIG. 8 flats 48a, 48a are illustrated as in FIG. 5 for the provision of an intereference fit with a bearing mounted within the housing portion and in FIGS. 7 and 8 it will be observed that shoulders may be provided at 44a, 44a as in the case of shoulders 44, 44 above.

From the foregoing it will be apparent that a molded plastic housing utilizing a plastic such as polybutylene terephthalate can provide the toughness, rigidity, strength, etc., required in the construction of a small motor air impeller unit of the type under consideration. Such a plastic is relatively impervious to chemicals, water, oil, etc., and is a good electrical insulator, an important consideration in the construction of small air impeller units. The plastic also provides for a significant reduction in the transmission of vibration and noise and can be manufactured in a molding process at economic advantage. With the bearings in the present invention resiliently and yet firmly held in alignment and in direct engagement with the axially projecting housing portion, a relatively easy assembly procedure is provided for. Efficient bearing alignment is yet achieved and maintained and the necessary structural integrity for mounting of the annular stator is also achieved. Thus, efficiencies in assembly are achieved and operational efficiencies can also be anticipated together with construction at substantial economic advantage.

We claim:

1. A molded plastic housing for a small electric motor having an annular stator and rotor arranged diametrically in inner-outer relationship and a central shaft operatively associated with and rotatable with the annular rotor disposed diametrically within the stator, said housing having at least one radially extending end wall and a centrally located and integrally molded stator mounting and shaft journalling tubular housing portion which projects axially from the end wall, said projecting housing portion having intermediate and axially spaced opposite end sections, the opposite end section being flexible, first and second bearings disposed respectively in the opposite end sections for rotatably receiving and holding said shaft, each of said opposite end sections having their flexibility enhanced by at least three axially extending and circumaxially spaced reduced diameter and reduced thickness zones at least approximately the length of its associated bearing, and each of said end sections having at least three circumaxially spaced narrow discrete reduced diameter zones which extend axially, each of said bearings and its associated end section having an interference fit at least at said reduced diameter zones, and said annular stator being mounted on and about said projecting tubular housing portion.

2. A molded plastic housing for a small electric motor as set forth in claim 1 wherein said rotor takes the form of an annular permanent magnet with an operatively associated air impeller disposed diametrically outwardly thereof and rotatably driven thereby.

3. A molded plastic housing for a small electric motor as set forth in claim 1 wherein said reduced diameter and reduced thickness zones take the form of axially extending slots which open radially outwardly and which are also open at their ends axially at the outer axial ends of their respective end sections whereby to provide the enhanced flexibility of the bearing receiving end sections.

4. A molded plastic housing for a small electric motor as set forth in claim 3 wherein four equally circumaxially spaced and axially extending open end slots are provided at each end section of said tubular projecting housing portion.

5. A molded plastic housing for a small electric motor as set forth in claim 3 wherein said intermediate section of said tubular projecting housing portion extends annularly without interruption and with the aforesaid slots terminating axially at each axial end thereof for enhanced structural integrity of said intermediate section.

6. A molded plastic housing for a small electric motor as set forth in claim 3 wherein the axially extending slots in one end section of said tubular projecting portion are aligned axially with the corresponding axially extending slots in the opposite end section thereof.

7. A molded plastic housing for a small electric motor as set forth in claim 3 wherein the axially extending slots in one end section are displaced circumaxially so as to be misaligned axially with respect to the corresponding slots in the opposite end section of said axially extending portion.

8. A molded plastic housing for a small electric motor as set forth in claim 3 wherein an axially extending rib is provided along at least a part of the tubular axially extending portion of the housing and extends radially outwardly therefrom for engagement with and for circumaxial location of said stator relative to said housing portion.

9. A molded plastic housing for a small electric motor as set forth in claim 3 wherein the thickness reduction occurring at each of said slots is at least one half of the thickness of said tubular axially projecting housing portion.

10. A molded plastic housing for a small electric motor as set forth in claim 9 wherein said reduction in thickness at each of said slots is substantially in excess of one half of the thickness of said axially projecting housing portion.

11. A molded plastic housing for a small electric motor as set forth in claim 3 wherein the circumaxial dimension of each or said slots is one third or less than the circumference of said projecting tubular housing portion.

12. A molded plastic housing for a small electric motor as set forth in claim 11 wherein four slots are provided and each said slot extends approximately through one fourth the circumference of said projecting tubular housing portion.

13. A molded platics housing for a small electric motor as set forth in claim 3 wherein the reduced diameter at said reduced thickness zones is provided by flats equal in number to said slots and respectively disposed inwardly of said slots at the internal diametrical surface of said tubular projection so as to engage the external diametrical surface of said bearings.

14. A molded plastic housing for a small electric motor as set forth in claim 3 wherein the plastic of said housing is polybutylene terephthalate and wherein said rotor takes the form of an annular permanent magnet and an air impeller also constructed of said polybutylene terephthalate plastic and which is operatively associated with the rotor and disposed diametrically outwardly thereof for rotation thereby.

* * * * *